United States Patent [19]

Getz et al.

[11] Patent Number: 5,188,869
[45] Date of Patent: Feb. 23, 1993

[54] PROCESS FOR BURNISHING ANODE CURRENT COLLECTORS

[75] Inventors: Dale R. Getz, North Ridgeville; John C. Nardi, Brunswick, both of Ohio

[73] Assignee: Eveready Battery Company, Inc., St. Louis, Mo.

[21] Appl. No.: 749,022

[22] Filed: Aug. 23, 1991

Related U.S. Application Data

[63] Continuation-in-part of Ser. No. 566,925, Aug. 14, 1990.

[51] Int. Cl.$^5$ .............................................. B05D 3/12
[52] U.S. Cl. .................................. 427/242; 29/90.01; 51/293; 204/290 R; 204/293; 427/328; 427/383.3; 427/437
[58] Field of Search .................. 429/206; 29/90.01; 204/280, 279, 290 R, 293; 106/287.18; 51/1, 293; 427/242, 383.3, 328, 436, 437

[56] References Cited

U.S. PATENT DOCUMENTS

| 3,642,539 | 2/1972 | Kawakami | 136/30 |
| 4,942,101 | 7/1991 | Audebert et al. | 429/165 |
| 4,992,343 | 2/1991 | Nardi | 429/57 |

FOREIGN PATENT DOCUMENTS 3204 8/1958 Japan.
01307161 12/1991 Japan.

*Primary Examiner*—Mark L. Bell
*Assistant Examiner*—Deborah Jones
*Attorney, Agent, or Firm*—Robert W. Welsh

[57] ABSTRACT

Anode current collectors for electrochemical cells are burnished in a solution containing soluble indium ions.

15 Claims, No Drawings

PROCESS FOR BURNISHING ANODE CURRENT COLLECTORS

CROSS-REFERENCE TO RELATED APPLICATION

This application is a continuation-in-part of copending U.S. patent application Ser. No. 566,925, filed Aug. 14, 1990.

FIELD OF THE INVENTION

This invention relates to alkaline electrochemical cells that use anode current collectors burnished in a solution containing soluble indium.

BACKGROUND OF THE INVENTION

Alkaline electrochemical cells typically contain an alkaline electrolyte, such as potassium hydroxide, a cathode comprised of a metal oxide, such as manganese dioxide, and a zinc anode. These cells provide excellent performance and are used throughout the world in many consumer applications.

A detrimental characteristic of these cells is the formation of hydrogen gas. This gas can be formed by undesirable chemical reactions which occur at the surface of the anode current collector. As the quantity of gas increases, the internal pressure in the cell also increases. If this pressure increase is not relieved, the cells can eventually leak.

A widely used solution to the detrimental reactions which occur at the surface of the collector is the addition of mercury to the anode. Mercury in the anode plates onto the surface of the collector thereby inhibiting the formation of gas and thus enhancing the performance of the electrochemical cell. Unfortunately, as is well known, mercury may add to environmental pollution when cells are eventually discarded.

To address this environmental concern, the amount of mercury used in the cell has been lowered by adding zinc corrosion inhibitors to the cell. Examples of these inhibitors include lead, indium, cadmium, thallium, gold, silver, tin, gallium and compounds that incorporate these elements. These inhibitors have been alloyed with the zinc, deposited on the zinc, included in the electrolyte and deposited on the collector. Organic inhibitors, such as polyethylene glycol, have also been tried. These methods have led to the commercialization of low mercury content batteries, called "Ultra-low Mercury," that have about 250 parts of mercury per million parts based on total battery weight.

Unfortunately, these known inhibitors do not reliably permit the total removal of mercury from the cell. For example, indium is an effective inhibitor at certain levels of mercury, but surprisingly, at lower levels of mercury, indium is not as effective. The organic inhibitors are effective for cells that are undischarged and stored, but they do not inhibit gassing for cells that are partially discharged and then stored.

A deficiency found in some of the mercury free cells known to the inventor is the occurrence of an unexpected depression in the cell's voltage during discharge of the cell. These deviations from the expected voltage curve are usually temporary. Typically, the cell's voltage recovers and the cell proceeds to provide a reasonable amount of electrical service to the customer. This type of temporary depression and then recovery in voltage is referred to as a "dip". However, in some cases, the voltage does not recover from the early dip and the useful life of the cell is terminated prematurely thereby resulting in a "dud." Both of these problems, dips and duds, are undesirable.

In U.S. Pat. No. 4,942,101, figures five, six, seven and eight illustrate alkaline cells whose voltages "dip" during discharge and then recover. This patent is directed to an alkaline electrochemical cell that (1) is free of mercury, (2) incorporates specified quantities of selected organic stabilization compounds in the zinc powder, (3) utilizes an anode current collector that is constituted, at least superfically, by a substance selected from: pure zinc, pure cadmium, indium, and gallium, and (4) the surface of the current collector has been modified without melting of the metal so as to increase its developed surface area. While the invention described in this patent may solve the problem as described therein, the use in a commercially viable mass production process of a current collector that has been physically modified is potentially cumbersome and therefore expensive.

In view of these disadvantages, there is a need for an alkaline electrochemical cell that has a low mercury content or is free of mercury, does not exhibit either a temporary depression (i.e. dip) or a permanent drop (i.e. dud) in the voltage of the cell, does not exhibit excessive bulging and can be economically mass produced in a commercially viable process.

SUMMARY OF THE INVENTION

This invention is an alkaline electrochemical cell that comprises a container which is open at one end and closed at the other end, a cathode comprised of a metal oxide as the active cathode component, an anode comprised of zinc as the active anode component, an alkaline electrolyte, a separator and a collector assembly. The collector assembly comprises an anode current collector that had been burnished in a solution which contained soluble indium.

In another aspect, this invention is a process for burnishing current collectors for electrochemical cells. The process comprises adding current collectors to a container that contains a burnishing material and a solution comprised of soluble indium ions. The collectors are agitated in the container for a time effective to burnish the collectors and for the indium to associate with the collectors.

In yet another aspect, this invention is a multi step process in which the collectors are burnished and then, in a separate step, only the burnished collectors are associated with a solution comprised of soluble indium ions. The burnished collectors must be associated with the solution comprised of soluble indium ions within a time frame which insures that the collectors' burnished surfaces have not been oxidized. The burnished collectors must be left in contact with the indium containing solution for a time effective to associate the indium with the collectors.

The alkaline electrochemical cells of this invention show a reduction in the occurrence of temporary depressions (i.e. dips) or permanent drops (i.e. duds) in voltage, reduced gas formation and bulging under conditions of normal use and storage, and provide an effective amount of electrochemical energy to be useful as batteries. Further, these collectors are readily usable in commercially viable mass production processes.

DETAILED DESCRIPTION OF THIS INVENTION

The electrochemical cells of this invention comprise an alkaline electrolyte, a separator, a current collector assembly, a cathode and an anode arranged in a sealed container in a manner effective to provide electrochemical energy, i.e. when the cell is placed in a circuit, electrochemical energy is provided to the circuit. The cells have terminals of opposite polarity. One terminal is in contact with the cathode and the other is in contact with the anode. The cell is sealed in a manner effective to contain the cell's components in the container under conditions of transport and use. The cell construction may include a cupped metallic can, suitably constructed of steel, nickel or other metal and can be nickel plated in whole or in part. A tubular cathode containing the active cathode material and conductor can be lined on the inner surface of the can, and a separator suitably made of a non-woven cellulosic or polymer fiber can be lined on the inner surface of the tubular cathode. In this construction, the can is in contact with the cathode and thus is the cathode terminal. The current collector assembly seals the open end of the container and comprises the anode's current collector which had been burnished in a solution containing soluble indium.

The preferred electrochemical cells of this invention are substantially free of mercury. By "substantially free of mercury" is meant that the total amount of mercury present in all the components of the cell is an amount which does not result in a harmful amount of environmental pollution when the cell is discarded. Typically, the cells of this invention have less than 50 parts of mercury per million parts by total weight of the cell. Preferably, the mercury is present at less than 25 parts per million. More preferably, there is zero-added mercury to the cell. By "zero-added" is meant that no mercury is added to any of the cell components. Typically, a residual amount of mercury can be present in many natural products. Thus, for the preferred zero-added mercury cells of this invention the only amount of mercury present in the cell is the residual amount that is naturally present in the cell components. Thus, when the cells are disposed of, no amount of mercury is added to the environment that is greater than the amount that was present before the cell was assembled. For example, commercially available "pure zinc" can contain about 20 parts of mercury per billion parts by weight of zinc, and often contains much less than 20 parts per billion. For the zero-added mercury cells of this invention, the amount of mercury present will preferably be less than the level that can be detected analytically. Typically, the amount is less than 10 parts per million by total weight of the cell, preferably less than 5 parts per million, more preferably less than 2 parts per million, and most preferably less than 1 part per million.

The current collector assembly is comprised of a burnished anode current collector and a sealing member. The collector is burnished in a solution that contains soluble indium ions. By "burnishing" is meant that the surface of the collector is cleaned of surface oxides and residual contaminants. A clean shiny surface results. This can be accomplished by many means, for example, agitating the collectors with themselves or an abrasive material such as ceramic balls. Suitable ceramic balls are one-eighth of an inch in diameter type M ceramic balls made by Coors Ceramic Company of Golden, Colo. Other suitable ceramic material are one-eighth inch diameter stealite balls made by Union Process of Akron, Ohio.

The current collector assembly's sealing member is commonly made of plastic and shaped like a disc. This member fits tightly inside the open end of the container and is hermetically sealed to the container by conventional cell closing techniques. Examples of suitable sealing members are described in U.S. Pat. Nos. 3,314,824 and 4,255,499 which are herein incorporated by reference. The anode's current collector is electronically conductive and extends through the sealing member. The current collector forms an electrically conductive path between the anode and the cell's anodic terminal.

The anode current collectors employed in the cells of this invention are preferably brass. The typical brass anode current collector has a composition of about 65% to 70% copper and about 30% to 35% zinc. An example of a preferred alloy is a copper-zinc alloy.

In a copper-zinc alloy current collector, the copper is required to provide adequate conductivity for the current collector while the zinc will be compatible with the zinc anode. Preferably, the copper should comprise at least 50 weight percent of the copper-zinc alloy with the remainder substantially zinc and a minor amount of lead. A suitable copper-zinc alloy for use as the anode current collector would be copper alloy C26000 containing from 68.5 to 71.5 weight percent copper, less than 0.07 weight percent lead, and the remainder zinc. It is advantageous that the brass current collector be free of iron and nickel. Other suitable brass alloys used as current collectors are known as C27000 and C33000.

In addition to a copper-zinc alloy, any conductive material compatible with the electrochemical system of the cell could be used as the alloy material of the anode current collector. Thus, the anode current collector could be a conductive alloy composed of copper, zinc or brass containing a dispersion of lead throughout the alloy. A minor amount of cadmium in the anode current collector can also contribute to reduced gassing. The cadmium can be dispersed along with the lead throughout the anode current collector. The cadmium could be added in amount of at least 1000 parts per million based on the weight of the anode current collector. Preferably, the dispersed cadmium should be from 1500 parts per million to 2000 parts per million.

The collectors are burnished in a solution that contains soluble indium ions. In this process, the surface of the collectors are cleaned by the burnishing and the indium becomes associated with the collectors before a detrimental amount of oxides can form on the surface of the collectors. The preferred collectors will have a distribution of indium on the surface and the surface will be free of surface oxides. The indium can be a continuous or discontinuous coating, with a continuous being preferred. The solution containing the indium ions can be any solution in which an indium salt is used as a solute. Examples of indium salts include indium chloride and indium nitrate. Water is an example of a suitable solvent.

In a preferred process of this invention, the collectors, burnishing material and solution are all combined in a container, such as a tumbling machine. Optionally, a rinsing agent, such as JET DRY, manufactured by Ecolab, Inc. of Broadview, Ohio, may be included in the combination of materials to be agitated. The combination is then agitated, such as by tumbling or rotating, for a time sufficient to burnish the collectors and to allow the indium to become associated with the collectors. The length of time which the collectors must be agitated is dependent upon the concentration of indium in the solution. As the concentration of indium in the solution is decreased, the period of time which the collectors are agitated must be increased to insure that a minimum amount of indium is associated with the collectors. Conversely, as the concentration of indium in the solution is increased, then the collectors can be agitated for a shorter period of time and still be associated with the minimum amount of indium. After the collectors and burnishing material have been agitated for a sufficient period of time to associate a minimum amount of indium on the surface of the collectors, then the burnishing material and solution are removed from the combination. After rinsing and drying, the collectors are ready for use.

The amount of indium located on the surface of the collector after the burnishing has been completed should be at least 0.5 micrograms per square centimeter of the collector's surface area. Preferably, the amount of indium will exceed 1.0 microgram per square centimeter of the collector's surface area. While increasing the concentration of indium on the collector's surface is not detrimental to the cell's performance, increasing the concentration of indium above 200 micrograms of indium per square centimeter of the collector's area is not cost effective.

In a second version of the burnishing process, the collectors, burnishing material and a solution free of indium are combined in a container, such as a tumbling machine. Optionally, a rinsing agent such as Dreher A-13, manufactured by Dreher Corporation of Attleboro, Md., may be included in the tumbling solution. The combination is then agitated, such as by tumbling or rotating, for a time sufficient to burnish the collectors. The burnishing material and solution are separated from the burnished collectors. The burnished collectors are then combined in a container with a solution containing soluble indium ions. The time between removing the burnished collectors from the solution that does not contain soluble indium and associating the collectors with a solution containing soluble indium ions must be limited in order to prevent oxidation of the burnished collector surface. The time between burnishing and placing the burnished collectors in a solution containing indium ions should be less than twenty-four hours. Preferably, the time will not exceed twelve hours. Most preferably, the burnished collectors will be combined with the solution containing soluble indium ions within one hour after the collectors have been burnished. After the burnished collectors have been associated with the indium ions for a sufficient period of time to allow the indium to become associated with the collectors, the solution is removed and the collectors may be rinsed and dried. The treated collectors can be used immediately or stored for later use.

The electrolyte used in this invention is an aqueous alkaline solution, such as potassium hydroxide or sodium hydroxide. The concentration of the solution is any concentration that provides for ionic conductivity. Typically, in the assembled cell the concentration preferably ranges from about 30% to about 40%.

The cathode used in this invention is comprised of a metal oxide as the active cathode component. Examples include manganese dioxide and silver oxide. Preferred is manganese dioxide, and more preferred is electrolytic manganese dioxide (EMD). EMD, a widely available commercial product, is prepared by plating manganese dioxide from a manganese sulfate plating solution onto an electrode. The deposited manganese dioxide is subsequently removed from the electrode and recovered. One source is TOSOH Corporation, a Japanese company.

In addition to the metal oxide, the cathode further comprises a compound that is ionically conductive. This compound is called a conductor. Of the many types of known conductors, synthetic graphite is preferably used in the cells of this invention. Synthetic graphite is readily commercially available. One source is Lonza LTD, a Swiss company.

The cathode can further comprise a binder. Examples of suitable binders include polytetrafluoroethylene and polyethylene.

The cathode is comprised of mostly metal oxide, a conductive amount of the graphite and often an effective amount of binder. Typically, the metal oxide will comprise between about 80 to about 85 weight percent of the total cathode weight. When a binder is employed, the binder will comprise less than about 0.5% by weight. The remainder of the cathode will be comprised of graphite and electrolyte solution. The amount of the electrolyte solution is sufficient to wet the dry components, and to provide a mixture that can be molded. The cathodes are prepared by mixing the components together and dispensing the mix into the container. The mix is then molded or compressed against the inside of the container.

Zinc is used as the active anode material in the cells of this invention. Preferably, the zinc is low expansion zinc, and is in powder form. The powdered zinc is combined with a binder, optional components, and an amount of the electrolyte solution to form a gel. Typically, the anode gel expands when it is discharged and then stored.

Another parameter that has been found to be useful for identifying the preferred zinc for cells of this invention is the amount of iron in the zinc. Advantageously, the zinc has less than 10 parts of iron per million parts by weight of zinc. Preferably, the zinc contains less than 5 ppm of iron. More preferred is zinc that contains less than 3 ppm of iron.

The cells of this invention preferably employ additives that inhibit the corrosion of zinc. One beneficial component that can be added to the cell to inhibit the corrosion of zinc is an ethylene oxide polymer and derivatives thereof. The ethylene oxide polymers are comprised of ethylene oxide moieties and can be substituted with organic and inorganic moieties. Suitable polymers include phosphate esters of ethylene oxide polymers, such as those disclosed in U.S. Pat. No. 4,195,120; perfluorated organic compounds of the ethoxylated fluoroalcohol type, such as those disclosed in U.S. Pat. No. 4,606,984; and alkyl and polyethoxyl alcohol sulfides, such as those disclosed in U.S. Pat. No. 4,781,999, all herein incorporated by reference. Preferred polymers for use in this invention are di and triethylene glycol, the polyethylene glycols having an average molecular weight range of about 190 to about 7000, and their mono and diethers and esters. Suitable ethers and esters of polyethylene glycols are the C4 and lower alkyl ethers and C4 and lower alkanoate esters. Examples of ether derivatives include methoxy diethylene glycol and the methoxy and ethoxy polyethylene glycols. Examples of ester derivatives include polyethylene glycol acetate.

The preferred ethylene oxide polymers are the polyethylene glycols and methoxy polyethylene glycols having molecular weights averaging from about 300 to 700.

The ethylene oxide polymers can be used singularly or in combination. They are generally soluble in water and can be added as a water solution to the cell. The ethylene oxide polymer can be added directly to the zinc during the production of the anode gel. Alternatively and additionally, the polymer additive can be included in water that is employed to pre-wet the separator in order to facilitate the wetting of the separator by the electrolyte. The polymer can then migrate to the zinc surface as the cell comes to equilibrium.

The ethylene oxide polymer is employed in the cell in an amount sufficient to inhibit the corrosion reaction between the zinc and the alkaline electrolyte. In general, beneficial effects are obtained with proportions of ethylene oxide polymer in excess of about 0.001 mg per gram of zinc, and preferably of about 0.01 mg per gram of zinc. Much larger proportions than these can be employed. For instance, amounts as large as 0.1 mg per gram of zinc have been employed and the beneficial effects obtained. However, amounts of the ethylene oxide polymer greater than about 0.1 mg per gram of zinc are generally considered to be in excess.

It can also be desirable to add an indium-containing compound to the anode mix. Suitable compounds include indium hydroxide, indium oxide, indium metal and the like. Preferably, the compounds are soluble in the electrolyte solution. Indium hydroxide is preferred. The amount of indium employed is an amount sufficient to inhibit the corrosion reaction between the zinc and alkaline electrolyte. This amount is preferably between about 0.001 and about 1 mg per gram of zinc and more preferably, between about 0.05 and about 0.2 mg per gram of zinc.

The indium-containing compound is added in any manner that will enable it to become associated with the zinc. Preferably it is added directly into the anode mix. Additionally, the indium-containing compound can be added to the electrolyte solution.

The anode is prepared by mixing the zinc powder, ethylene oxide polymer, optional binder and an amount of electrolyte effective to form a paste or gel. Advantageously, the indium-containing compound is also added. This paste or gel can then be injected into the container.

It is advantageous that space be left in the cell to accommodate any gas that is formed. This space, or void volume, will vary according to the cell size and amount of zinc employed. The larger the cell, generally, the larger the void volume. Typically, the cells of this invention have a void volume of 6% to 12% of the cell's internal volume.

The substantially mercury-free, non-leaking cells of this invention can be obtained in different ways with different combinations of the components. A preferred combination is the use of the electrolytic manganese dioxide, synthetic graphite, low-iron or low expansion zinc, ethylene oxide polymer, indium-containing compound and burnished brass current collector. A slightly less preferred combination includes the same components except for the indium-containing compound. Consistently good results are obtained with different variations in type of zinc, anode collector, etc. when used in combination with both the ethylene oxide polymer and indium-containing compound.

The cells of this invention can be made by first molding the cathode mix into the cell container. The mix is molded into the form of a tube. Preferably, two separator strips are formed into a basket lining the interior of the cathode mix tube. The anode, made of a mixture of active anode material, electrolyte, and, optionally, an electrolyte-swellable binder such as a polyacrylic acid, is enclosed within the separator. The current collector assembly is then inserted into the open end of the container so that the current collector is in contact with the anode and the sealing member forms a hermetic seal with the top inside wall of the container. The cell is closed with a cover and sealed. The cover, which is in contact with the anode current collector that extends through the sealing member, is the anode terminal of the cell. It is desired that the cell construction not have a venting means that would vent due to the normal pressure generated in the cell during a normal discharge.

The electrochemical cells of this invention will typically have an initial voltage of about 1.58 volts as determined by the difference in potential between the anode and the cathode. Preferably, the cells exhibit no leakage of the cell components after discharging the cells through an electrical resistor to 1.2 volts, and after being stored at 21 degrees Centigrade for ninety days. More preferably, the cells of this invention exhibit no leakage after being discharged to 0.8 volts and then stored for the stated period. The cells can also exhibit no leakage after being discharged through an electrical resistor to 1.2 volts and then stored at 45 degrees Centigrade for thirty days, and preferably, after being discharged to 0.8 volts and so stored. More preferably, the cells exhibit no leakage when discharged through an electrical resistor to 1.2 volts, and then stored at 71 degrees Centigrade for three days, and preferably, after being discharged to 0.8 volts and so stored. Most preferably, the cells exhibit no leakage when discharged through an electrical resistor to 1.2 volts, and then stored at 71 degrees Centigrade for seven days and preferably, after being discharged to 0.8 volts and so stored.

These discharge and storage conditions are representative of the actual use made of the cells or batteries. For example, the batteries can be used in a device, such as a radio. However, the battery is typically not fully discharged. The device and battery may then be put aside for a period before they are used again. The cells of this invention exhibit no leakage when conventionally used and so stored. The value of the electrical resistance can vary according to cell size. Typically, the cells of this invention will exhibit no leakage when discharged through an electrical circuit that has an electrical resistance value of 20 ohms or less depending on cell size. For example, a conventional D-size cell or battery (2.406 inches high by 1.344 inches diameter) can be discharged to 1.2 volts through a 2.2 ohm resistor and stored without showing leakage. A C-size (1.969 inches high by 1.031 inches diameter) or AA-size (1.988 inches high by 0.563 inch diameter) cell or battery can be discharged through a 3.9 ohm resistor to 1.2 volts and stored without showing leakage. A AAA-size cell or battery (1.745 inches high by 0.41 inch diameter) can be discharged through a 5 ohm resistor to 1.2 volts and then stored without showing leakage. A AAAA-size cell or battery (1.648 inches high by 0.310 inch diameter) can be discharged through a 20 ohm resistor to 1.2 volts and then stored without showing leakage.

Under normal discharge conditions, hydrogen gas is formed and will cause the cells to bulge. If the cells bulge too much, they will leak. The actual amount of bulge that causes leakage will vary according to cell size. For C-size cells, a bulge of greater than 40 mils will often cause leakage. The cells of this invention, regardless of size, exhibit a degree of bulge less than the amount that will typically cause leakage of the cell components.

By "leakage" of the cell components is meant that there is no leakage of the components attributable to undersirable gas formation. It is always possible to have leakage due to poor cell construction such as improper sealing of the cell. These improper and poor performing construction conditions are known. Also, "leakage" as used in this specification is different from creepage of the electrolyte. By nature, aqueous alkaline electrolyte solutions creep along the surface of metals. The amount of creepage in a normally constructed cell is small, and is not equivalent to the type of leakage of the components that occurs when an undesirable amount of gas is formed.

The cells of this invention also exhibit an effective amount of performance. For example, C-size cells made according to the claimed invention and which contain 23.4 g of manganese dioxide and 9.1 g of Zn provided 45 to 50 hours of usable service when discharged through a 10 ohm resistor for four hours per day.

The following examples are provided to illustrate the concept of the invention. The examples do not limit the scope of the invention.

EXAMPLES

Example 1

Several AA size batteries are constructed with zinc anodes, manganese dioxide cathodes, and potassium hydroxide electrolytes. Indium hydroxide is added to the anode. The anode collectors are shaped like a nail and are made from C26000 brass. The collectors are burnished in a tumbling barrel with ⅛ inch diameter ceramic balls and a solution containing 1.09 g of indium chloride per 1000 ml of deionized water. The collectors do not show any surface oxides and have an indium concentration of 1.6 micrograms per square centimeter on the surface of the collector.

One sample of cells are tested in a straight shelf test, i.e., they are stored at various temperatures and for various periods of time, and the net bulge of the cells is measured. Fifteen cells are stored at 71 degrees Centigrade for four weeks. These cells show an average bulge of 1.6 mils. Five other cells are stored at 45 degrees Centigrade for one month and show an average bulge of 1.2 mils. Another five cells are stored at 21 degrees Centigrade for one month and show an average bulge of 0.3 mils.

Another number of cells are partially discharged to 0.8 volts and then stored at various temperatures and for various times and the gross bulge is measured. Ten cells are stored at 71 degrees Centigrade for four weeks and show an average bulge of 7.1 mils. Five other cells are stored at 45 degrees Centigrade for one month and show an average bulge of 1.4 mils. Another five cells are stored at 21 degrees Centigrade for one month and show an average bulge of 0.2 mils.

Example 2

Twenty C-size batteries, identified herein as lot 1, are constructed with mercury free zinc anodes, manganese dioxide cathodes, potassium hydroxide as the electrolyte, 0.2 mg of indium per gram of zinc and 0.005 mg of polyethylene glycol per gram of zinc. The nail shaped collectors are burnished in a solution containing soluble indium prior to inserting the collectors into the cells. All cells are discharged continuously across a 3.9 ohm resistor to a 0.75 volt end point. One of the twenty cells, or five percent of the cells tested, shows a dip in the voltage curve.

A second lot of twenty C-size batteries, identified herein as lot 2, are made in an identical manner as the batteries in lot 1 except that the collectors are burnished in a solution that does not contain soluble indium. When discharged continuously across a 3.9 ohm resistor to a 0.75 volt end point, eight of the twenty batteries, or forty percent of the cells tested, show a dip in the voltage curve. Therefore, burnishing the anode collectors in a solution containing soluble indium reduced the percentage of cells with an undesirable dip in the voltage curve from forty percent to five percent.

A third lot of twenty C-size batteries, identified herein as lot 3, are made in an identical manner as the batteries in lot 1 except that the level of polyethylene glycol is 0.01 mg per gram of zinc in the anode. As in lot 1, the anode current collectors are burnished in a solution containing soluble indium. All cells are discharged continuously across a 3.9 ohm resistor to a 0.75 volt end point. None of the twenty cells show a dip in the voltage curve.

A fourth lot of twenty C-size batteries, identified herein as lot 4, are made in an identical manner as the batteries in lot 3 except that the collectors were burnished in a solution containing no soluble indium. When discharged continuously across a 3.9 ohm resistor, sixteen of the twenty batteries, or eighty percent of the entire lot, show a dip in the voltage curve. In addition, one cell failed prematurely. Therefore, of the twenty cells tested in lot 4, seventeen cells, or eighty-five percent, are classified as a dip or a dud.

A comparison of the data in lots 3 and 4 clearly demonstrates the substantial reduction (i.e. from 85% to 0%) in the "dip" or "dud" defect rate when the anode current collectors are burnished in a solution containing soluble indium.

Example 3

Several thousand D-size nail shaped current collectors, made from C26000 brass, are burnished by combining the collectors in a suitable tumbling machine with one-eighth inch diameter ceramic balls and a solution containing 1.09 grams of indium chloride per 1000 ml of deionized water plus a small quantity of "Jet Dry" rinsing agent. The loaded tumbling machine is rotated for ninety minutes. After separating the collectors from the burnishing solution and ceramic material, the collectors are analyzed for the quantity of indium on the surface of the collectors. The analysis shows 8.0 micrograms of indium per square centimeter of collector surface area.

We claim:
1. A process for burnishing anode current collectors for electrochemical cells, comprising the steps of:
    a) adding current collectors to a container that contains a burnishing material and a solution comprised of soluble indium ions; and
    b) agitating the collectors in the presence of the solution for a time effective to burnish the collectors and for the indium to be distributed on the surface of the collectors.

2. The process of claim 1, wherein the burnishing material is the collectors themselves.

3. The process of claim 1, wherein the burnishing material is an abrasive material.

4. The process of claim 3, wherein the burnishing material comprises ceramic balls.

5. The process of claim 1, wherein the collectors are agitated by rotating the container.

6. The process of claim 1, wherein the collectors are agitated until at least an average of 0.5 micrograms of indium per square centimeter is associated with the collector's surface.

7. The process of claim 1 wherein the solution comprised of soluble indium contains indium chloride.

8. A process for burnishing current collectors for electrochemical cells comprising the steps of:
   a) adding current collectors to a container that contains a burnishing material;
   b) agitating the current collectors and burnishing material for a time effective to burnish the collectors;
   c) separating the burnished collectors from the burnishing material; and
   d) combining the burnished collectors with a solution comprised of soluble indium ions for a time effective to deposit indium on the surface of the burnished collectors.

9. A process for burnishing current collectors for electrochemical cells, as recited in claim 8, wherein the time between step c and step d is limited so as to prevent the formation of oxides on the collectors' burnished surfaces.

10. A process for burnishing current collectors for electrochemical cells, as recited in claim 8, wherein the time between step c and step d is less than twenty-four hours.

11. A process for burnishing current collectors for electrochemical cells, as recited in claim 8, wherein the time between step c and step d is less than twelve hours.

12. A process for burnishing current collectors for electrochemical cells, as recited in claim 8, wherein the time between step c and step d is less than one hour.

13. A process for burnishing current collectors for electrochemical cells, as recited in claim 8, wherein the burnishing material is an abrasive.

14. A process for burnishing current collectors for electrochemical cells, as recited in claim 13, wherein the burnishing material is a ceramic material.

15. A process for burnishing current collectors for electrochemical cells, as recited in claim 8, wherein in step d the collectors are associated with the solution containing soluble indium ions until the concentration of indium on the surface of the collectors exceeds 0.5 micrograms per square centimeter of the collectors surface area.

* * * * *